United States Patent
Ben-Natan

(10) Patent No.: US 11,030,241 B2
(45) Date of Patent: Jun. 8, 2021

(54) QUERY USAGE BASED ORGANIZATION FOR VERY LARGE DATABASES

(71) Applicant: jSonar Inc., Lexington, MA (US)

(72) Inventor: Ron Ben-Natan, Lexington, MA (US)

(73) Assignee: Imperva, Inc., San Mateo, CA (US)

(*) Notice: Subject to any disclaimer, the term of this patent is extended or adjusted under 35 U.S.C. 154(b) by 7 days.

(21) Appl. No.: 15/452,072

(22) Filed: Mar. 7, 2017

(65) Prior Publication Data

US 2018/0260468 A1 Sep. 13, 2018

(51) Int. Cl.
| | |
|---|---|
| G06F 16/28 | (2019.01) |
| G06F 16/25 | (2019.01) |
| G06F 16/2453 | (2019.01) |
| G06F 9/455 | (2018.01) |
| G06F 16/84 | (2019.01) |
| G06F 16/27 | (2019.01) |
| G06F 16/81 | (2019.01) |

(52) U.S. Cl.
CPC .......... *G06F 16/81* (2019.01); *G06F 9/45504* (2013.01); *G06F 16/24544* (2019.01); *G06F 16/258* (2019.01); *G06F 16/278* (2019.01); *G06F 16/84* (2019.01)

(58) Field of Classification Search
CPC .......... G06F 16/86; G06F 16/84; G06F 16/81; G06F 16/278; G06F 16/24552; G06F 16/258; G06F 9/45504
See application file for complete search history.

(56) References Cited

U.S. PATENT DOCUMENTS

| | | | | |
|---|---|---|---|---|
| 7,499,908 | B2* | 3/2009 | Elnaffar | G06F 9/5083 |
| 8,805,820 | B1* | 8/2014 | Maunder | G06F 16/41 |
| | | | | 707/715 |
| 9,507,762 | B1* | 11/2016 | Lashley | G06F 16/00 |
| 10,769,127 | B2* | 9/2020 | Dandekar | G06F 16/2272 |
| 2012/0101995 | A1* | 4/2012 | Agetsuma | G06F 3/0605 |
| | | | | 707/644 |
| 2013/0263117 | A1* | 10/2013 | Konik | G06F 9/5077 |
| | | | | 718/1 |
| 2014/0281247 | A1* | 9/2014 | Loaiza | G06F 12/0875 |
| | | | | 711/126 |
| 2015/0058843 | A1* | 2/2015 | Holler | G06F 9/455 |
| | | | | 718/1 |

(Continued)

*Primary Examiner* — Marc S Somers
(74) *Attorney, Agent, or Firm* — Armis IP Law, LLC

(57) ABSTRACT

A query server identifies data collections of interest in a cloud store, and categorizes the collections based on an intended usage. Depending on the intended usage, the categorized data may be cataloged, indexed, or undergo a full intake into a column store. In a database of large data collections, some collections may experience sparse or indefinite usage. Cataloging or indexing position the collections for subsequent query access, but defers the computational burden. The full intake performs a columnar shredding of the collection for facilitating eminent and regular query access. Upon invocation of query activity, an instantiation of virtual machines provided by the cloud store vendor implements query logic, such that the VMs launch in conjunction with the cloud store having the collections. Collections therefore incur processing based on their expected usage-full intake for high query traffic collections, and reduced cataloging for maintaining accessibility of collections of indefinite query interest.

12 Claims, 5 Drawing Sheets

(56) References Cited

U.S. PATENT DOCUMENTS

2015/0199408 A1* 7/2015 Wulff .................... G06F 16/245
707/688
2018/0089324 A1* 3/2018 Pal ........................ G06F 9/5011

* cited by examiner

QUERY USAGE BASED ORGANIZATION FOR VERY LARGE DATABASES

BACKGROUND

Cloud object stores are increasing in popularity as an alternative to local storage, and have collectively become the largest data stores in the world. Cloud stores provide ultra-reliable storage at a very low cost and provide the simplest path to store and retrieve data. A complementary technology is found with unstructured databases and corresponding large data stores often referred to as "big data." Unstructured databases are becoming a popular alternative to conventional relational databases due to the relaxed format for data storage and the wider range of data structures that may be stored. In contrast to conventional relational databases, where strong typing imposes data constraints to adhere to a predetermined row and column format, unstructured databases impose no such restrictions. Analytics and statistical data lend themselves well to unstructured databases, and cloud data services offer a readily available mechanism for access.

SUMMARY

A query server and application identifies data collections of interest in a cloud store, and categorizes the collections based on an intended usage. Depending on the intended usage, the categorized data may be cataloged, indexed, or undergo a full intake into a-column store. In a database of large, unstructured data collections, some collections may experience sparse or indefinite usage. Cataloging or indexing positions the collections for subsequent query access, but defers the computational and intake burden. The full intake performs a columnar storage on the collection for facilitating eminent and regular query access. Upon invocation of query activity, an instantiation of virtual machines (VMs) provided by the cloud store vendor implements query logic, such that the VMs launch in conjunction with the cloud store having the collections. Collections therefore incur processing based on their expected usage-full intake for high query traffic collections, and reduced cataloging for maintaining accessibility of collections of indefinite query interest. Upon query invocation, large collections need not be transported because query activity occurs on VMs of the cloud storage service.

Configurations herein are based, in part, on the observation that so-called "cloud" object stores are becoming an increasingly popular storage medium, and have virtually unlimited capacity and unsurpassed reliability over conventional local hard drives or SSDs (solid state devices) on a home or office computing device. Major vendors such as AMAZON®, GOOGLE® and MICROSOFT® offer storage services on a volume basis. Unfortunately, conventional approaches to access of such third party storage services suffer from the shortcoming of network latency and transmission volume when accessing large volumes of data. Data from cloud stores must still be retrieved and brought to an application for consuming and processing the data. In a large database, cloud access can impose substantial constraints. In other words, a conventional application or query operating on a cloud store is required to transport the data to the database or application. Accordingly, configurations herein substantially overcome the above described shortcomings by instantiating a query platform via the service on which the data is stored, in effect bringing the database to the data. Upon identification of a collection of data, a query server catalogs the data for use in subsequent queries, and may perform other processing to best transform the data for the subsequent queries. A subsequent user request performs a query using the cataloged data, and is performed very efficiently if the query is consistent with the previously completed transformation. Queries may still be satisfied if the queried collection was cataloged differently, but may incur additional time and processing.

Cloud storage vendors also provide computing facilities in the form of virtual machines, which afford access to their cloud stores based on a CPU type and network access bandwidth. Query logic in the forms of scripts or compiled code is brought into the virtual machine, in contrast to transporting the cloud-stored data to the local machine of the user, thus mitigating the need to transport a large database.

The cloud-based query platform described above is particularly beneficial with unstructured and semi-structured data stores, due to the size and often sparse nature of accessed fields. Unstructured databases are becoming a popular alternative to conventional relational databases due to the relaxed format for data storage and the wider range of data structures that may be stored. In contrast to conventional relational databases, where strong typing imposes data constraints to adhere to a predetermined row and column format, unstructured databases impose no such restrictions. Very large volumes of data (on the order of millions of records) may often be stored in such an unstructured form, where transport of the entire database is prohibitive in terms of time and/or cost.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
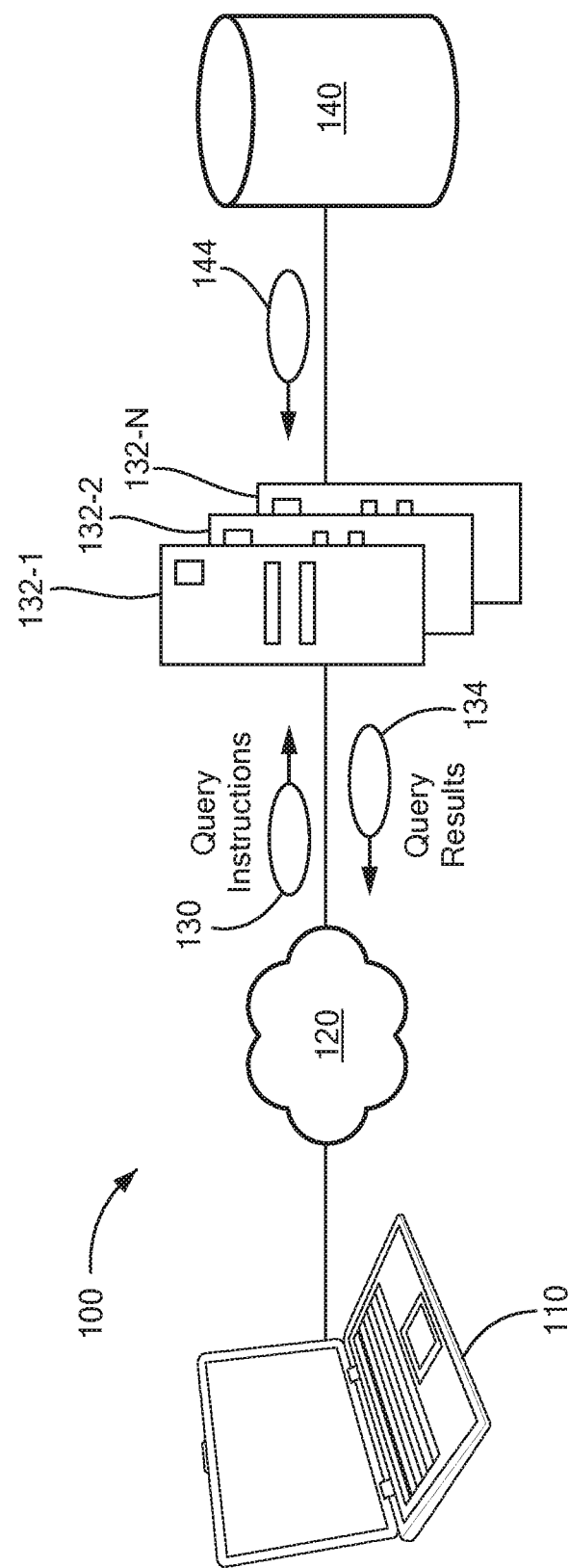
FIG. 1 is a context diagram of a computing environment suitable for use with configurations disclosed herein.

Modern computing trends are turning towards the concept of a cloud data store. This represents a largely transparent arrangement of distributed and networked storage accessible to a user in a manner similar to conventional local drives. While the location and manner of storage may not be known to the user, reliability and accessibility is assured by the cloud service provider who allocates storage to users, typically on a fee per storage unit basis. Cloud storage therefore effectively implements a kind of storage area network (SAN) of enterprise computing formally used by specific businesses or corporations, and defines it as a commodity item available to the general user. Equally important is the availability of virtual computing resources often offered by the vendors of the cloud storage. Sometimes referred to as VMs or hypervisor based approaches, users can invoke processing resources defined in terms of processor number and type and bandwidth of data available from the cloud storage. The computing demand can be matched to the burden for invoking a larger number of smaller processors, a small number of fast, powerful processors, and may also be scaled for an appropriate data access rate from the cloud. Configurations herein leverage this capability to consolidate the computing resources, data storage and query tasks in an optimal manner that mitigates transfer or traversal of sparse or seldom used data.

In the configurations described below, some terminology can be generalized to normalize the different aspects of the system and provide tangible definition to the virtual and unrestrictive labels common with a virtualized approach to computing. A "collection" is a body of data stored in one or more files, usually in a string of text characters according to a syntax such as JSON (Javascript Object Notation) or CSV (Comma Separated Variables). Such a collection is often defined as unstructured or semi-structured data due to relaxed field and type restrictions that set it apart from conventional, rigid typing on relational database management systems (RDBMS). Collections are often referred to as a database, as one or more collections may be grouped under a designation of a database covering a particular topic, task or body of information. A collection of data may represent a massive number of entries, or documents that would present substantial computational issues to process as a relational data set. A "document" is the first level of decomposition of a collection, and may often be thought of as analogous to a record in a relational system.

A "network" refers to any suitable communications linkage between computing devices, and includes the Internet and other LAN/WAN and wireless arrangements between the user, data storage and processing. Although the figures depict a "cloud" in a particular position, it should be understood that connectivity between devices is generally afforded by the underlying network infrastructure.

An "object store" refers to data that has undergone an intake into the present system as a cataloged collection based on the expected usage. The intake transforms the data according to an expected usage, and has therefore been "identified" as available for query by the methods disclosed herein.

A "query server" refers to a server or application for directing the intake, transforming the data, receiving user queries, and generating instructions for satisfying the user query by operations performed on the transformed data. The figures depict this as a separate node or computing device, but the same could be realized by an application launched on the user computing device.

An "intake" or ingestion refers to identifying and cataloging a cloud resident collection for query usage by the disclosed approach. The ingestion involves a transformation that varies based on the expected usage, discussed further below, and positions the data to be responsive to the queries according to the expected usage. Deviations are permitted, but may increase response time and compute intensity because the database has not been preprocessed consistent with the query.

Document-based, unstructured, NoSQL databases maintain data as documents, typically as either JSON documents or XML documents. A set of documents are maintained within a collection. A server maintains an interface and array of pipelined processors for receiving an unstructured data set having a large collection of documents.

The disclosed approach implements a method that "brings the database to the data" rather than "bring the data to the database" for fulfilling a query request. Rather than loading the data in the object store into another storage mechanism, the disclosed approach architects the database in a NoDB approach where the database can run directly on the data within the object store. This allows performance of queries on any data without moving the data and also allows usage of inexpensive and reliable storage for housing the data. In effect, the disclosed approach makes use of a cloud object store as a globally distributed SAN.

Once of the benefits of using a "global SAN" is that it allows us to make the database itself totally elastic and able to run anywhere. The query server can bring up one VM compute node or 100 compute nodes, some can be powerful machines and some very small machines and all that differs is how they partition the data to run on. Since they all have access to the same "global SAN" they each can run independently on their piece of the data and prepare their part of the result set and then the node that received the original query (and sent off the part of the query to each of the other nodes) stitches the result set together and performs the later part of the query. In the disclosed approach, the generated query instructions are a query language based on a pipeline, which affords partitioning. Most operations can be pushed down to individual VMs and stitching becomes a small operation. As a result, the query can be partitioned into subdivisions of the collection, and then each subdivision allocated to a particular VM of a number of VMs operating in parallel.

Figure 4A:
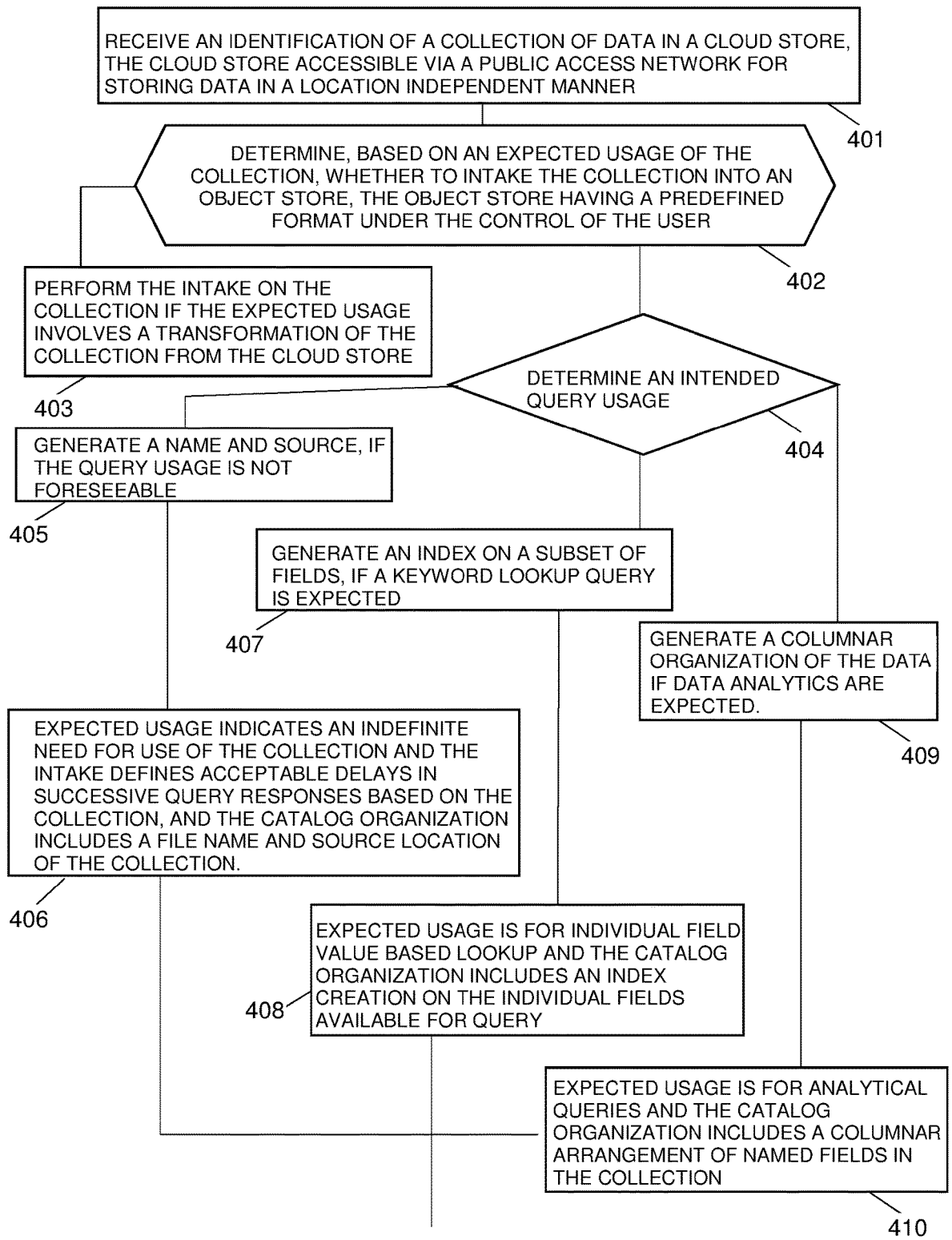
FIGS. 4A and 4B are a flowchart depicting a query as in FIG. 3.
Figure 4B:
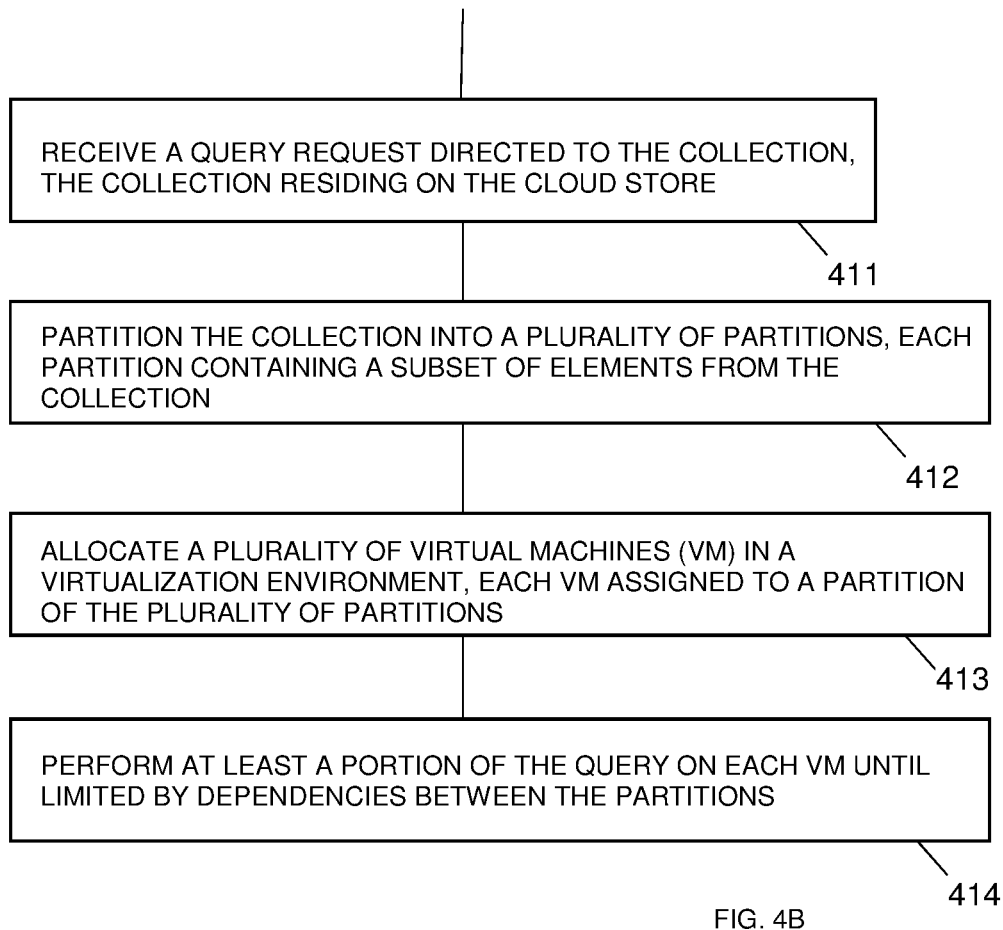

The disclosed approach employs number of architectural options, all using a cloud object store, but in different ways (allowing for different attributes of cost, performance and usability). These options can be described as a decision tree for determining an intake of collections to position, or preprocess, the collections for subsequent queries, discussed in further detail below with respect to FIGS. 4A-4B.

While the data will generally reside on a cloud store, the first and most important branching of the decision tree is whether the data is loaded into the object store and then metadata subsequently built over the data, or whether the data is loaded into a columnar database which prepares the metadata during the ingestion and creates files that are stored on the object store as a column store.

A second branch in the decision tree is what type of queries (or workload) will be expected—will it be analytic in nature (complex queries) or OLTP (simple key-based queries), or both. Based on the expected usage of the user, the intake will generate either a columnar representation of the data (for analytic queries) or indexes (for OLTP queries) next to the data. In the case where we ingest the data through the database we build these at ingestion time. In the case where we "bring the database to the data" we build these representations when we first query the data. When we do build these representations (e.g. columnar), we store these data sets also on the objects store next to the original data. Building columnar and indexed representations is expensive so we build it when we first use it and store it for future use. This also implies management of invalidation—i.e. we hash the original files to know if they have changed and if they have changed we throw away the built structures and rebuild them. It is therefore important for us to manage metadata on a fairly granular level—e.g. on Amazon S3 metadata is gathered per file and per bucket and the metadata structures maintained at the same level and within the same bucket structure.

FIG. 1 is a context diagram of a computing environment suitable for use with configurations disclosed herein. Referring to FIG. 1, in a query environment 100, a user computing device 110, such as a desktop, laptop or mobile device is coupled to a public access network 120 such as the Internet. In response to a query request, the computing device 120 sends query instructions 130 via the network 120. In response, a plurality of virtual machines (VMs) 132-1 . . . 132-N (132 generally) are instantiated for performing the query by accessing collections on a cloud store 140. The cloud store 140 is any suitable remote SAS or SAN (Storage Area Network) storage medium, operable for network access from the computing device 120. Typically the cloud store 140 and the VMs 132 are sourced from the same provider. A number of VMs 132 are instantiated for performing the query, discussed further below, by receiving a transmitted raw data collection 144 from the cloud store. Upon completion, query results 134 are returned and rendered on the computing device 110.

Figure 2:
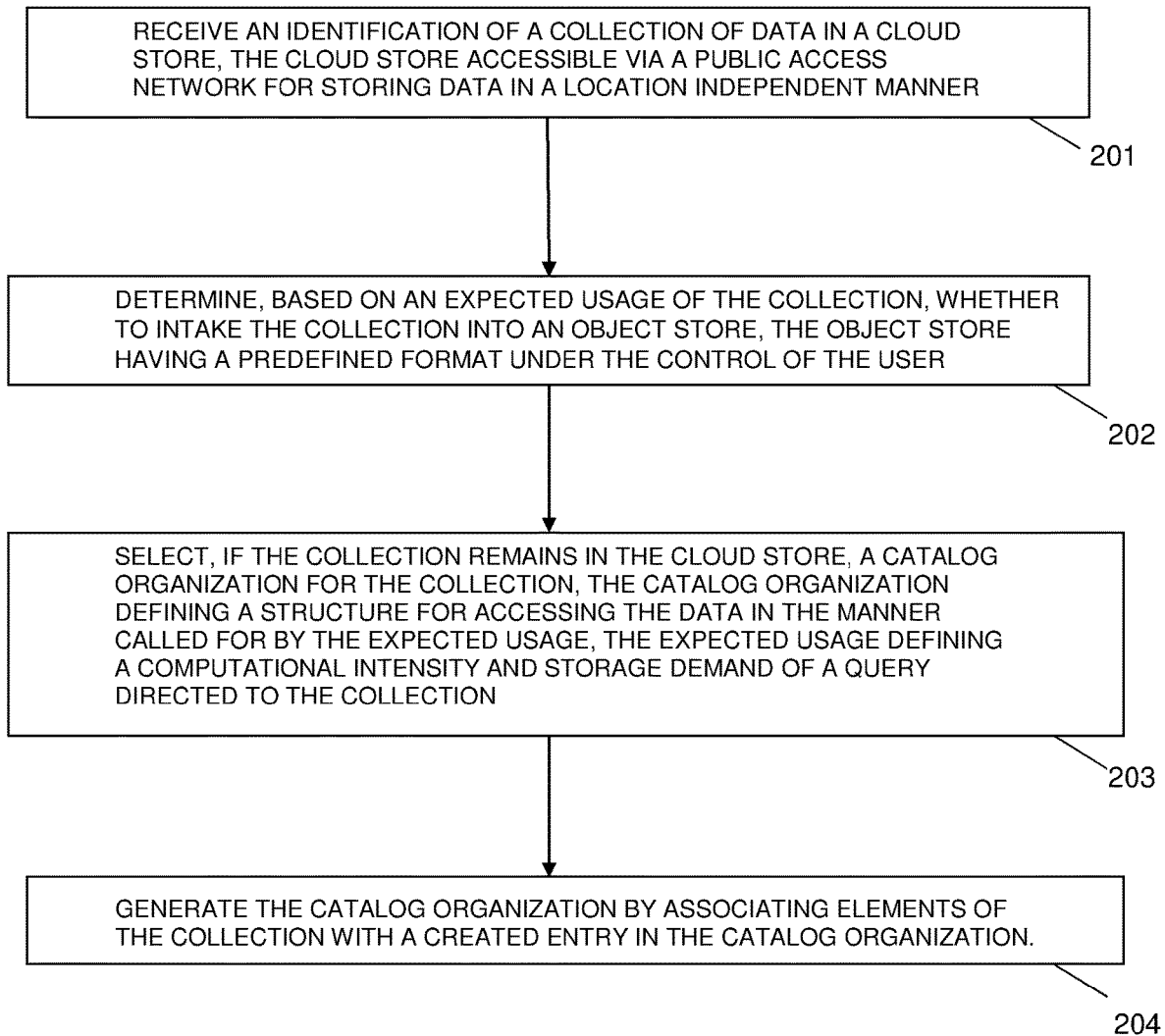
FIG. 2 is a flowchart of a particular configuration operable in the environment of FIG. 1.

FIG. 2 is a flowchart of a particular configuration operable in the environment of FIG. 1. Referring to FIGS. 1 and 2, the method for defining and querying large databases includes, at step 201, receiving an identification of a collection of data in a cloud store 140, such that the cloud store 140 is accessible via a public access network 120 for storing data in a location independent manner. Step 202 involves determining, based on an expected usage of the collection, whether to intake the collection into an object store, such that the object store has a predefined format under the control of the user. An intake operation identifies a transformation of the data to position it for queries according to the expected usage. The intake selects, if the collection remains in the cloud store 140, a catalog organization for the collection, such that the catalog organization defines a structure for accessing the data in the manner called for by the expected usage, as depicted at step 203. The expected usage defines a computational intensity and storage demand of a query directed to the collection. For example, if a collection is expected to be accessed only infrequently, the catalog operation might need only identify the name and source of the collection. In general, the intake generates the catalog organization by associating elements of the collection with a created entry in the catalog organization, as depicted at step 204. The substance and complexity of the created entry can vary significantly based on the expected usage, discussed further below in FIGS. 3 and 4A-4B.

Figure 3:
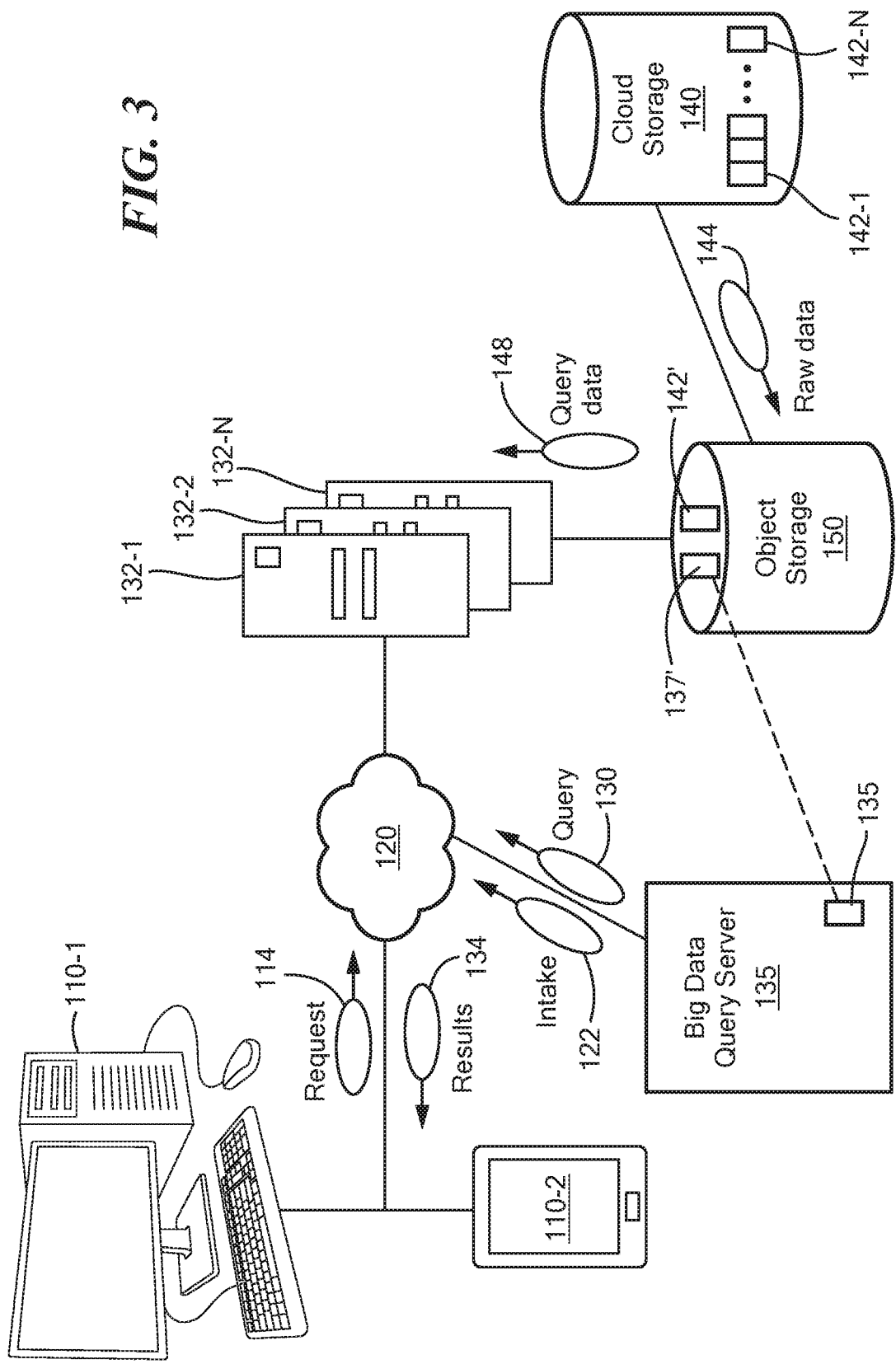
FIG. 3 is a block diagram of data flow in the environment of FIG. 1.

FIG. 3 is a block diagram of data flow in the environment of FIG. 1. Referring to FIGS. 1-3, from the user perspective, a user computing device such as a desktop 110-1 or mobile device 110-2 (laptop, tablet, smartphone) employs a GUI (graphical user interface) to formulate a query request 114. The query request 114 is received by a query server 135 for generating the query instructions 130.

Prior to query request 114 fulfillment, the query server 135 oversees the intake for positioning the data based on the expected use, and maintains a catalog 137 of collections 142-1 . . . 142-N available for query. Alternatively, the catalog 137' may also be stored in the object store 150. Generally, the catalog 137 includes metadata that tells the query server 135 the location and format of the data to be queried. The intake instructions 122, discussed further below in FIGS. 4A and 4B, transform the raw data 144 based on the expected usage. An object store 150 stores the collections 142' depending on the intake, and provides query data 148 to the VMs 132. The actual data may reside in the object store 150 or the cloud store 140 depending on the transformation performed by the intake. The object store 150 may store the collections 142 in a columnar form, an index or lookup form, or a name and location form. Alternatively, an application on the user computing device 110 may operate as the query server 135.

Following intake, where the query server 135 now has a cataloged identity of collections 142 available for query, the query server 135 receives a query and an identifier of a collection as a query request 114. The query server 135 determines the catalog 137 organization of the collection 142. The query server 135 transmitting the query, an indication of the catalog organization, and a set of instructions 130 for performing the query to each of the plurality of VMs 132 for performing the query. The intake instructions 122 therefore determine the catalog 137 entry and transformation of each collection 142. The query instructions 130 tell the VMs 132 how to access and perform the query request 114. Therefore, based in the query instructions 130, the collection 142 may further define a plurality of collections 142-N, and performing the query may include performing a join on at least two of the collections 142.

The query instructions 130 also specify the VMs 132 for satisfying the query request 114. Each VM 132 has a computing speed and a bandwidth, and the query instructions 130 also determine the plurality of VMs 132 based on a cost of each VM and a number of VMs for accommodating the partitions of data into which the collections 142 may be segmented. Each VM 132 may perform at least a portion of the query until limited by dependencies between the partitions.

FIG. 4 is a flowchart depicting a query as in FIG. 3. Query processing is preceded by intake for generating a catalog 137 entry for each collection 142 to be queried. The query server 135 receives an identification of a collection of the data 142 in the cloud store 140, as depicted at step 401. A decision is made, at step 402, to determine, based on an expected usage of the collection, whether to intake the collection into the object store 150.

At step 403, an intake is performed on the collection if the expected usage involves a transformation of the collection 142 from the cloud store 140, such that the intake transfers the identified collection from the cloud store 140 to the object store 150, in which the object store has a columnar format. This positions the data in a format readily accessible to the user for extended and complex OLAP (Online Analytic Processing) queries using the efficiency afforded by the columnar format. In this scenario, the intake operation stores the collection in a columnar form in the object store, as disclosed in copending U.S. patent application Ser. No. 14/304,497, filed Jun. 13, 2014, entitled "COLUMNAR STORAGE AND PROCESSING OF UNSTRUCTURED DATA," incorporated herein by reference.

Alternatively, selecting the catalog 137 organization includes determining an intended query usage, as depicted at step 404. A workload defines the expected usage, such that the workload is based on a likelihood of an eminent query of the collection and whether the query includes a lookup or online analytical processing (OLAP). Three organizational levels are depicted, however alternate catalog approaches could be employed. At step 405, the query server 135 generates a name and source, if the query usage is not foreseeable. This is the least computationally intensive approach and merely identifies the data for subsequent queries. It is selected when the expected usage indicates an indefinite need for use of the collection 142 and the intake defines acceptable delays in successive query responses based on the collection 142, such that the catalog 137 organization includes a file name and source location of the collection 142, as shown at step 406. It is best reserved for data collections 142 that may be sparse or duplicative of other collections such that a definite query cannot be anticipated.

Another workload calls for generating an index on a subset of fields, if a keyword lookup query is expected, as depicted at step 407. This approach is called for if the expected usage is for individual field value based lookup, such that the catalog organization includes an index creation on the individual fields available for query, as depicted at step 408.

A greater expected workload calls for generating a columnar organization of the data, if data analytics are expected, as depicted at step 409. This involves an expected usage is for analytical queries and the catalog organization includes a columnar arrangement of named fields in the collection 142, as shown at step 410, and is similar to the columnar approach of step 405 depending on whether data is stored in the object store 150 or remains in the cloud store 140.

In each of the above approaches, the catalog organization may further include a defer flag indicative of whether to defer creation of the catalog organization until receipt of a query request 114.

Turning now to the user experience, which normally follows the intake consideration but could occur prior, depending on the defer flag, the query manager 135 receives a query request 114 directed to one or more collections 142, as shown at step 411. The query instructions 130 partition the collection 142 into a plurality of partitions, such that each partition contains a subset of elements or documents from the collection 142, as depicted at step 412. The query instructions 130 allocate a plurality of virtual machines (VM) 132 in a virtualization environment, such that each VM 132 is assigned to a partition of the plurality of partitions, as disclosed at step 413, and the VMs 132 each perform at least a portion of the query on each VM until limited by dependencies between the partitions. For example, summations or sorting of a field across all documents or elements may be deferred. Following completion of each of the VMs, the query server 135 coalesces each of the VMs to generate results 134 for rendering on the user computing device 110.

Those skilled in the art should readily appreciate that the programs and methods defined herein are deliverable to a user processing and rendering device in many forms, including but not limited to a) information permanently stored on non-writeable storage media such as ROM devices, b) information alterably stored on writeable non-transitory storage media such as floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A method for defining large databases, comprising:
   receiving an identification of a collection of data in a cloud store, the cloud store accessible via a public access network for storing data in a location independent manner;
   determining, based on an expected usage of the collection, whether to intake the collection into an object store, the object store having a predefined format under the control of the user;
   selecting, if the collection remains in the cloud store, a catalog organization for the collection, the catalog organization defining a structure for accessing the data in the manner called for by the expected usage, the expected usage defining a computational intensity and storage demand of a query directed to the collection; and
   generating the catalog organization by associating elements of the collection with a created entry in the catalog organization, wherein selecting the catalog organization includes:
     determining an intended query usage and:
       generating a name and source, if the query usage is not foreseeable;
       generating an index on a subset of fields, if a keyword lookup query is expected; and
       generating a columnar organization of the data, if data analytics are expected.

2. The method of claim 1, further comprising:
   performing, if the expected usage involves a transformation of the collection from the cloud store, the intake on the collection, the intake transferring the identified collection from the cloud store to the object store, the object store having a columnar format.

3. The method of claim 1 wherein a workload defines the expected use, the workload based on a likelihood of an eminent query of the collection and whether the query includes a lookup or online analytical processing (OLAP).

4. The method of claim 1 wherein the expected usage indicates an indefinite need for use of the collection and the intake defines acceptable delays in successive query responses based on the collection, and the catalog organization includes a file name and source location of the collection.

5. The method of claim 1 wherein the expected usage is for individual field value based lookup and the catalog organization includes an index creation on the individual fields available for query.

6. The method of claim 1 wherein the expected usage is for analytical queries and the catalog organization includes a columnar arrangement of named fields in the collection.

7. The method of claim 1 wherein the catalog organization further includes a defer flag indicative of whether to defer creation of the catalog organization until receipt of a query request.

8. The method of claim 1 further comprising:
   receiving a query request directed to the collection, the collection residing on the cloud store;
   partitioning the collection into a plurality of partitions, each partition containing a subset of elements from the collection;
   allocating a plurality of virtual machines (VMs) in a virtualization environment, each VM assigned to a partition of the plurality of partitions; and
   performing at least a portion of the query on each VM until limited by dependencies between the partitions.

9. The method of claim 8, further comprising:
receiving a query and an identifier of a collection;
determining the catalog organization of the collection; and
transmitting the query, an indication of the catalog organization, and a set of instructions for performing the query to each of the plurality of VMs for performing the query.

10. The method of claim 9 wherein the collection further comprises a plurality of collections, and performing the query includes performing a join on at least two of the collections.

11. The method of claim 8 wherein each VM has a computing speed and a bandwidth, further comprising determining the plurality of VMs based on a cost of each VM and a number of VMs for accommodating the partitions.

12. The method of claim 1 wherein the columnar format stores values based on named fields.

* * * * *